(12) United States Patent
Jaeb

(10) Patent No.: US 7,918,357 B2
(45) Date of Patent: Apr. 5, 2011

(54) MEDIA STORAGE CONTAINER

(75) Inventor: Michael S. Jaeb, Millersburg, OH (US)

(73) Assignee: Atlas AGI Holdings LLC, Greenwich, CT (US)

( * ) Notice: Subject to any disclaimer, the term of this patent is extended or adjusted under 35 U.S.C. 154(b) by 974 days.

(21) Appl. No.: 11/606,773

(22) Filed: Nov. 30, 2006

(65) Prior Publication Data

US 2007/0138174 A1 Jun. 21, 2007

Related U.S. Application Data

(60) Provisional application No. 60/741,708, filed on Dec. 2, 2005.

(51) Int. Cl.
*B65D 6/20* (2006.01)
*B65D 8/18* (2006.01)
*B65D 85/00* (2006.01)

(52) U.S. Cl. ............... 220/4.22; 220/4.21; 220/4.23; 220/315; 220/324; 220/326; 220/810; 220/836; 206/307

(58) Field of Classification Search .............. 220/4.21, 220/4.22, 4.23, 315, 324, 326, 328, 810, 220/836, 835; 206/307
See application file for complete search history.

(56) References Cited

U.S. PATENT DOCUMENTS

| | | | |
|---|---|---|---|
| 976,165 A | 11/1910 | Gray | |
| 1,774,543 A | 9/1930 | Babbitt | |
| 2,411,946 A | 12/1946 | Vogel | |
| 3,108,734 A | 10/1963 | Hewko | |
| 3,175,853 A | 3/1965 | Gilbertson | |
| 3,306,520 A | 2/1967 | Allard | |
| 3,414,157 A | 12/1968 | Wright | |
| 3,485,408 A | 12/1969 | Benesch | |
| 3,494,458 A | 2/1970 | Meierhoefer | |
| 3,583,556 A | 6/1971 | Wagner | |
| 3,635,331 A | 1/1972 | Zucker | |
| 3,858,749 A | 1/1975 | Selley et al. | |
| 3,876,071 A | 4/1975 | Neal et al. | |
| 3,907,103 A | 9/1975 | Shaw | |
| 3,933,381 A | 1/1976 | Schurman | |
| 3,990,575 A | 11/1976 | Egly | |
| 4,011,940 A | 3/1977 | Neal et al. | |
| 4,054,206 A | 10/1977 | Kobayashi et al. | |
| 4,078,657 A | 3/1978 | Schurman | |
| 4,102,452 A | 7/1978 | Sato et al. | |
| 4,105,112 A | 8/1978 | Graf | |
| 4,153,178 A | 5/1979 | Weavers | |
| 4,231,474 A | 11/1980 | Takahashi | |
| 4,248,345 A | 2/1981 | Bowers | |

(Continued)

FOREIGN PATENT DOCUMENTS

EP 0 233 163 A1 8/1987

(Continued)

*Primary Examiner* — Anthony Stashick
*Assistant Examiner* — Madison L Wright
(74) *Attorney, Agent, or Firm* — McDermott Will & Emery LLP

(57) ABSTRACT

A media storage container has a latch that is movable between latched, unlatched, and storage positions. The latch is disposed inside the outer periphery of the container when the latch is in the storage position. A method of using the container includes the steps of moving the latch to the storage position for shipping the container and moving the latch from the storage position to the open position while the container is loaded with media.

19 Claims, 14 Drawing Sheets

U.S. PATENT DOCUMENTS

| | | |
|---|---|---|
| 4,291,801 A | 9/1981 | Basili et al. |
| 4,293,266 A | 10/1981 | St. Lawrence |
| 4,344,646 A | 8/1982 | Michel |
| 4,365,711 A | 12/1982 | Long et al. |
| 4,381,836 A | 5/1983 | Rivkin et al. |
| 4,489,832 A | 12/1984 | Helms |
| 4,512,470 A | 4/1985 | Sieben |
| 4,531,670 A | 7/1985 | Kupersmit |
| 4,610,371 A | 9/1986 | Karkiewicz |
| 4,634,004 A | 1/1987 | Mortensen |
| 4,643,281 A | 2/1987 | Erickson |
| 4,746,008 A | 5/1988 | Heverly et al. |
| 4,805,769 A | 2/1989 | Soltis et al. |
| 4,834,238 A | 5/1989 | Hehn et al. |
| 4,838,420 A | 6/1989 | Collett et al. |
| 4,865,190 A | 9/1989 | Gregerson et al. |
| 4,871,065 A | 10/1989 | Hehn et al. |
| 4,892,189 A | 1/1990 | Kunimune et al. |
| 4,901,882 A * | 2/1990 | Goncalves .................... 220/324 |
| 4,921,097 A | 5/1990 | Finke et al. |
| 4,974,740 A | 12/1990 | Niles |
| 5,033,778 A | 7/1991 | Niles et al. |
| 5,148,914 A | 9/1992 | Budert et al. |
| 5,211,283 A | 5/1993 | Weisburn et al. |
| 5,215,188 A | 6/1993 | Wittman |
| 5,219,087 A | 6/1993 | Christensson |
| 5,259,221 A | 11/1993 | Whitmore |
| 5,285,918 A | 2/1994 | Weisburn |
| 5,297,672 A | 3/1994 | MacTavish |
| 5,305,873 A | 4/1994 | Joyce |
| 5,417,319 A | 5/1995 | Chalberg et al. |
| 5,443,159 A | 8/1995 | Cheng |
| 5,460,266 A | 10/1995 | Mundorf et al. |
| 5,499,714 A | 3/1996 | Konno |
| 5,509,528 A | 4/1996 | Weisburn |
| 5,515,967 A | 5/1996 | Fitzsimmons |
| 5,551,560 A | 9/1996 | Weisburn et al. |
| 5,562,207 A | 10/1996 | O'Brien et al. |
| 5,566,828 A | 10/1996 | Claes et al. |
| 5,575,399 A | 11/1996 | Intini |
| 5,597,068 A | 1/1997 | Weisburn et al. |
| 5,636,737 A | 6/1997 | Marsilio |
| 5,645,167 A | 7/1997 | Conrad |
| 5,662,218 A | 9/1997 | Ladwig |
| 5,664,405 A | 9/1997 | Perego |
| 5,680,932 A | 10/1997 | Dickinson |
| 5,682,991 A | 11/1997 | Lammerant et al. |
| 5,697,498 A | 12/1997 | Weisburn |
| 5,718,332 A | 2/1998 | Tachibana |
| 5,727,681 A | 3/1998 | Li |
| 5,730,283 A | 3/1998 | Lax |
| 5,762,187 A | 6/1998 | Belden, Jr. et al. |
| 5,769,218 A | 6/1998 | Yabe |
| 5,779,039 A | 7/1998 | Ambrus |
| 5,782,350 A | 7/1998 | Weisburn et al. |
| 5,782,352 A | 7/1998 | Senda |
| 5,788,068 A | 8/1998 | Fraser et al. |
| 5,788,105 A | 8/1998 | Foos |
| 5,799,782 A | 9/1998 | Gelardi |
| 5,819,929 A | 10/1998 | Chung |
| 5,823,341 A | 10/1998 | Nakasuji |
| 5,878,878 A | 3/1999 | Wu |
| 5,899,327 A | 5/1999 | Sykes |
| 5,901,840 A | 5/1999 | Nakasuji |
| 5,904,246 A | 5/1999 | Weisburn et al. |
| 5,906,274 A | 5/1999 | McEwan |
| 5,931,291 A | 8/1999 | Sedon et al. |
| 5,931,294 A | 8/1999 | Weingarden |
| 5,934,114 A | 8/1999 | Weisburn et al. |
| 5,944,173 A | 8/1999 | Boire et al. |
| 5,944,181 A | 8/1999 | Lau |
| 5,944,185 A | 8/1999 | Burdett et al. |
| 5,988,375 A | 11/1999 | Chang |
| 5,988,376 A | 11/1999 | Lax |
| 5,996,788 A | 12/1999 | Belden, Jr. et al. |
| 6,070,721 A | 6/2000 | Levitan |
| 6,070,722 A | 6/2000 | Ng |
| 6,076,667 A | 6/2000 | Ambrus |
| 6,082,156 A | 7/2000 | Bin |
| 6,102,200 A | 8/2000 | Dressen et al. |
| 6,105,767 A | 8/2000 | Vasudeva |
| 6,119,857 A | 9/2000 | Stumpff |
| 6,135,280 A | 10/2000 | Burdett et al. |
| 6,155,087 A | 12/2000 | Necchi |
| 6,155,417 A | 12/2000 | Flores, Jr. et al. |
| 6,164,446 A | 12/2000 | Law |
| 6,196,384 B1 | 3/2001 | Belden, Jr. |
| 6,206,185 B1 | 3/2001 | Ke et al. |
| 6,206,186 B1 | 3/2001 | Cerda-Vilaplana et al. |
| 6,398,022 B1 | 6/2002 | Mou et al. |
| 6,467,616 B2 | 10/2002 | Hegarty |
| 6,478,150 B1 | 11/2002 | Sølling |
| 6,719,133 B2 | 4/2004 | Perez et al. |
| 6,789,692 B2 | 9/2004 | Prezelin |
| 6,832,686 B2 | 12/2004 | Donegan |
| 6,863,175 B2 | 3/2005 | Gelardi |
| 6,907,987 B2 | 6/2005 | Lee |
| 6,981,586 B2 | 1/2006 | Onmori et al. |
| D544,743 S | 6/2007 | Lax |
| 2002/0033348 A1 | 3/2002 | Flores |
| 2002/0096517 A1 | 7/2002 | Gelardi |
| 2003/0000856 A1 | 1/2003 | Lax |
| 2003/0075463 A1 | 4/2003 | Perez et al. |
| 2003/0116455 A1 | 6/2003 | Marsilio |
| 2003/0121296 A1 | 7/2003 | Cheung |
| 2003/0146119 A1 | 8/2003 | Lee |
| 2003/0173369 A1 | 9/2003 | Nikolaus et al. |
| 2003/0217939 A1 | 11/2003 | Hegarty |
| 2004/0144662 A1 | 7/2004 | Bolognia |
| 2004/0188286 A1 | 9/2004 | Lax |
| 2005/0077196 A1 | 4/2005 | Corley |
| 2005/0121950 A1 | 6/2005 | Hegarty |
| 2005/0145530 A1 | 7/2005 | Gelardi |
| 2005/0160774 A1 | 7/2005 | Weinstein |
| 2005/0269223 A1 | 12/2005 | Wawrzynowski |
| 2006/0196790 A1 | 9/2006 | Perez |
| 2007/0102309 A1 | 5/2007 | Osborn |
| 2007/0102310 A1 | 5/2007 | Osborn |
| 2007/0163902 A1 | 7/2007 | Osborn |
| 2007/0267305 A1 | 11/2007 | Johnston |
| 2008/0011625 A1 | 1/2008 | Gelardi |
| 2008/0017542 A1 | 1/2008 | Le |

FOREIGN PATENT DOCUMENTS

| | | |
|---|---|---|
| WO | WO 99/59153 | 11/1999 |
| WO | WO 2006/058119 A1 | 6/2006 |

* cited by examiner

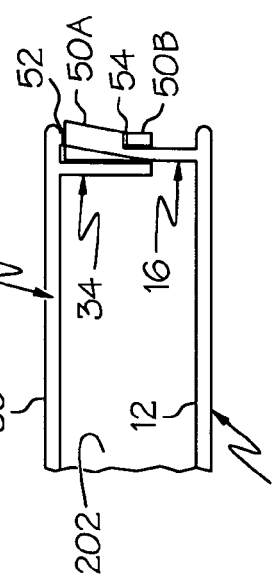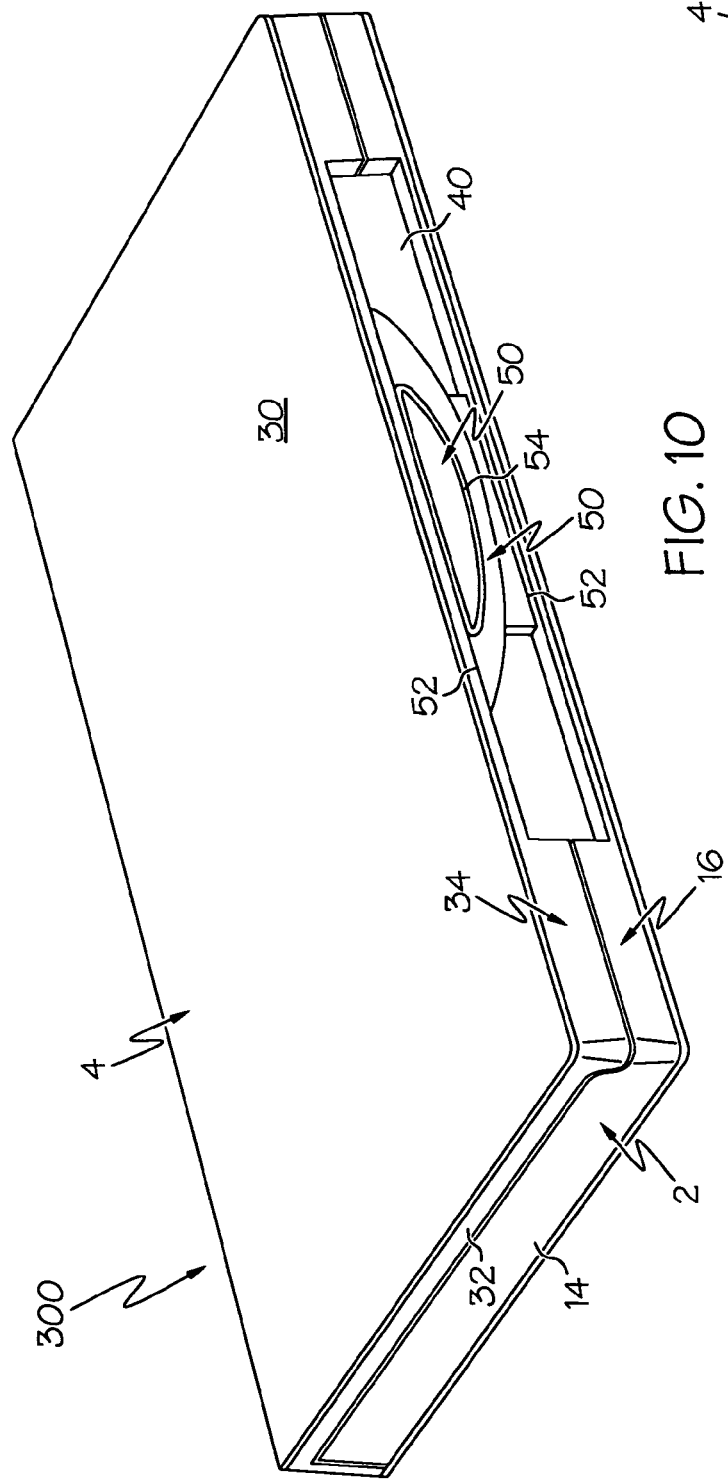

MEDIA STORAGE CONTAINER

CROSS REFERENCE TO RELATED APPLICATIONS

This application claims the benefit, under 35 U.S.C. §119 (e), of U.S. Provisional Patent Application No. 60/741,708 filed 2 Dec. 2005.

BACKGROUND OF THE INVENTION

1. Technical Field

The present invention generally relates to media storage containers and, more particularly, to media storage containers having latches that are used to keep the lid and base together in the closed position until the latch is moved to an unlatched position.

2. Background Information

A variety of latches have been used with media storage containers to hold the container lid closed with respect to the container base. Drawbacks with existing containers include the need to close the latches when the containers are shipped. Closed latches must be unlatched before the containers are loaded with media. When latches are left opened for shipment, extra room must be provided in the shipping containers. Another drawback is that consumers must tear some latches from the containers once the containers have been purchased. If the consumer wishes to retain the latches and use them from time to time, the latches are otherwise hanging outwardly from the container when not being used. A media storage container having a latch that may be moved to a storage position is thus desired in the media packaging art.

SUMMARY OF THE INVENTION

The invention provides a media storage container having a latch that is movable between latched, unlatched, and storage positions. The latch is disposed inside the outer periphery of the container when the latch is in the storage position. The invention also provides a method for using such a container. The invention also provides a configuration wherein the latch may be moved from the latched position to the unlatched position without the use of a specially designed key.

In one configuration, the invention provides a media storage container including: a base; a lid associated with the base and movable with respect to the base between open and closed positions; a latch connected to one of the base and lid with a hinge; the latch being movable between unlatched, latched, and storage positions; in the latched position, the latch engaging the other of the base and lid to prevent the lid from being moved from the closed position to the open position; in the unlatched position, the latch allowing the lid to be moved from the closed position to the open position; and in the storage position, the latch being disposed inwardly of the outer periphery of the base and lid when the lid is closed and the latch allowing the lid to be moved from the closed position to the open position.

Another configuration of the invention provides a media storage container including: a base having a bottom wall, a front wall, and a hinge wall; a media retainer associated with the bottom wall of the base; the media retainer adapted to retain a disc-shaped item of recorded media to the base; the hinge wall being connected to the bottom wall with a first living hinge; a lid associated with the base and movable with respect to the base between open and closed positions; the lid having a top wall and a front wall; the front walls of the base and lid cooperating to define a front wall of the container when the lid is in the closed position; an inner retainer releasably holding the lid in the closed configuration; the hinge wall being connected to the top wall of the lid with a second living hinge; the first and second living hinges being parallel and spaced apart; a latch pivotably connected to the base; the latch being pivotably movable between unlatched, latched, and storage positions; the front wall of the base defining a gap that allows the latch to pivot through the gap when moved from the unlatched position to the storage position; in the latched position, the latch engaging the lid to prevent the lid from being moved from the closed position to the open position; in the unlatched position, the latch allowing the lid to be moved from the closed position to the open position; in the storage position, a portion of the latch being disposed inwardly of the front wall of the base and the latch allowing the lid to be moved from the closed position to the open position; and in the storage position, a portion of the latch being disposed between the front wall of the container and the media retainer.

Another configuration of the invention provides a media storage container including: a container having an open configuration and a closed configuration; the container defining a storage compartment adapted to receive an item of recorded media; the container including a media retainer projecting into the storage chamber; the container including a latch that is pivotably movable between latched, unlatched, and storage positions; in the latched position, the latch maintaining the container in the closed configuration; in the unlatched position, the container being reconfigurable from the closed configuration to the open configuration; and in the storage position, the latch being disposed inwardly of the outer periphery of the container without interfering with the opening and closing of the container.

A further configuration of the invention provides a media storage container including: a base having a front wall; the front wall defining a gap; a lid associated with the base and movable with respect to the base between open and closed positions; a latch connected to the base; the latch being aligned with the gap defined by the front wall; the latch being pivotably movable between unlatched, latched, and storage positions; in the latched position, the latch engaging the lid to prevent the lid from being moved from the closed position to the open position; in the unlatched position, the latch allowing the lid to be moved from the closed position to the open position; and in the storage position, a portion of the latch being disposed inwardly of the gap defined by the front wall of the base and the lid to being movable between the open and closed positions.

The invention also provides a method of packaging recorded media using a media storage container; the method including the steps of: (A) providing a media storage container having a base, a lid, and a latch; the latch movable between unlatched, latched, and storage positions; (B) moving the latch to the storage position; (C) closing the lid to form a closed container; (D) shipping the closed container to a replicator; (E) opening the lid; (F) loading an item of recorded media into the container; (G) moving the latch to the unlatched position; (H) closing the lid; and (I) moving the latch to the latched position.

The invention also provides a method of opening a media storage container having externally accessible latch that holds the lid closed when the latch is in a latched position; the method including the steps of: moving the latch to an unlatched position; opening the media storage container; moving the latch to a storage position inside the media storage container; and closing the media storage container over a portion of the latch.

The different elements of the exemplary configurations described herein may be used alone or in combination with each other to form additional configurations.

BRIEF DESCRIPTION OF THE DRAWINGS

FIG. 10 is a perspective view of the front of a third configuration of a media storage container having an external latch showing the latch in the latched position.

FIG. 11 is a section view taken of the latch of FIG. 10.

The features of these configurations may be used alone or in combination with each other.

DETAILED DESCRIPTION OF THE INVENTION

Figure 22:
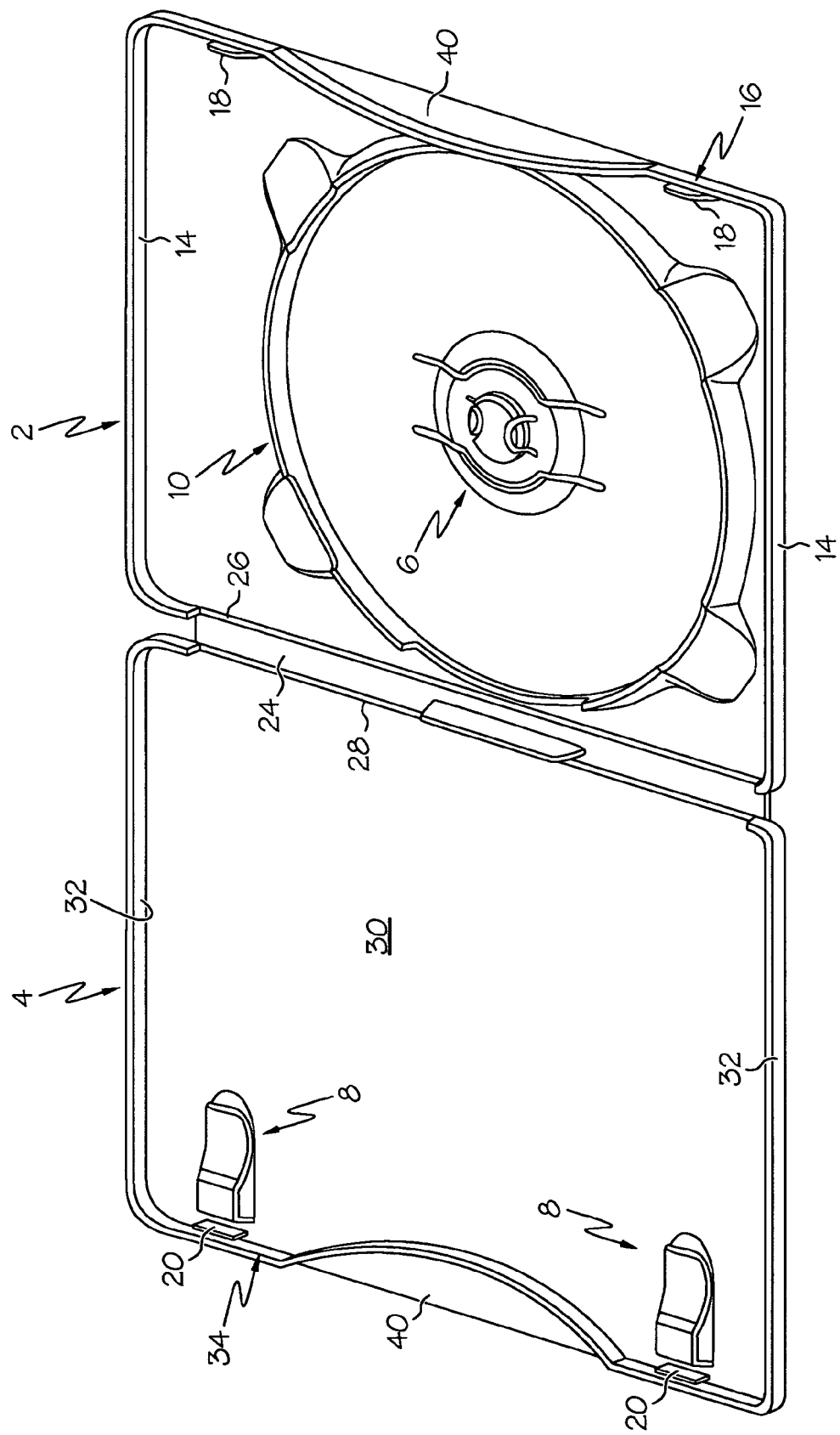
FIG. 22 is a schematic view of an open container having features common to the configurations of the application.

Common reference numerals are used in the following descriptions of the different configurations of the media storage container for similar parts of the containers. FIG. 22 depicts the common container features. In general, the following container configurations have a base 2 and a lid 4. The lid and base may also be referred to as a container portions. These portions are movable relative to one another between open and closed positions. The open position provides access to the item stored within the container while the closed position inhibits such access. When the portions are closed, the container has an outer periphery that is defined as the outer boundaries of the container. This outer boundary—and thus the outer periphery—extends across openings and indentations defined by a container surface. The outer boundaries are the outermost surfaces of the container portions. Although the portions are typically hinged together to form a clamshell arrangement, some containers utilize a sliding configuration while others allow the portions to become completely separated when in the open position.

One, or both, of base 2 and lid 4 includes a media retainer 6 adapted to retain an item of recorded media. Retainer 6 may be a hub such as those known in the art for holding CDs and DVDs. The hub may be a push button-type hub or a fixed position hub. Retainer 6 also may be a disc retainer or cartridge retainer that holds the outer edges of a media cartridge. Retainer 6 also may be a pocket that allows at least a portion of the item of recorded media to be slipped into the pocket. Base 2 and lid 4 may further include a second retainer 6 that may or may not be different than the first retainer 6. One of base 2 and lid 4 may also include literature booklet retainers 8. When retainer 6 is configured to hold a media disc (such as a CD or a DVD), a nest wall 10 may be disposed around retainer 6.

Base 2 generally includes a bottom wall 12 sized to cover the item of recorded media to be held by the media storage container. A peripheral wall including sidewalls and a front wall projects upwardly from the outer peripheral edge or near the outer peripheral edge of bottom wall 12. Sidewalls 14 project upwardly from opposite lateral edges of bottom wall 12. Sidewalls 14 are generally disposed perpendicular to bottom wall 12. Base 2 also includes a front wall 16 that generally extends perpendicular to sidewalls 14 and to bottom wall 12. Front wall 16 may be integrally connected to sidewalls 14 at the corners of base 2. In containers having bottom walls 12 that end at sidewalls 14 and front wall 16, the outermost surfaces of sidewalls 14 and front wall 16 define a portion of the outer periphery of the container. When bottom wall 12 extends beyond the outer surface of front wall 16 to form a ledge, the outer periphery of the container is defined by the outermost edge of bottom wall 12.

Inner lid retainers 18 are typically disposed adjacent front wall 16 for holding lid 4 closed as is know in the art. Retainers 18 also may be positioned adjacent sidewalls 14 or inwardly from either sidewalls 14 or front wall 16. Retainers 18 frictionally hold or hold with a snap-fit a foot portion 20 of lid 4 to prevent lid 4 from undesirably swinging open. Foot portions 20 may be enlarged to snap fit into retainers 18. Retainers 18 may be disposed on lid 4 with foot portions 20 being disposed on base 2.

Base 2 may also include a hinge wall 24 that is connected to bottom wall 12 with a first hinge 26 such as a living hinge. Hinge wall 24 may be connected to lid 4 with a second hinge 28 such as a second living hinge 28 spaced from and disposed parallel to the first living hinge 26. Second living hinge 28 may be connected to a top wall 30 of lid 4. The outermost surface of hinge wall 24 defines a portion of the outer periphery of the container when base 2 and lid 4 do not extend beyond hinge wall 24.

Sidewalls 32 project outwardly from opposite lateral edges of top wall 30. Sidewalls 32 are disposed perpendicular to top wall 30. Lid 4 also includes a front wall 34 that is perpendicular to sidewalls 32 and to top wall 30. Front wall 34 is integrally connected to sidewalls 32 at the corners of lid 4. In containers having top walls 20 that end at sidewalls 32 and front wall 34, the outermost surfaces of sidewalls 32 and front wall 34 define a portion of the outer periphery of the container. Front walls 34 and 16 may define an inset or concave central portion 40 the surfaces that define inset 40 is not a portion of the outer periphery of the container.

Each of the following configurations includes a latch 50 that is movable between an unlatched position (allowing lid 4 to be opened and closed with respect to base 2) to a latched position (wherein lid 4 is held in its closed position). In a first embodiment of each configuration, latch 50 may be moved from the latched position to the unlatched position without the need for a specially designed key. Each latch 50 is connected to one of base 2 and lid 4. In the exemplary configurations, latches 50 are connected to bases 2. Latches 50 also may be connected to lids 4 with the appropriate elements reversed on container. Unless otherwise specified, the invention functions in a similar manner regardless to which container portion (base or lid) latch 50 is connected. In the exemplary embodiments, each latch 50 is connected to the container with a hinge 52 that allows latch 50 to pivot about hinge 52 between the unlatched and latched positions. Latch 50 and hinge 52 may be configured to place latch 50 inside the outer periphery of the container, flush with the outer periphery of the container, or outside the outer periphery of the container. Hinge 52 optionally may be configured to allow the user to easily tear latch 50 away from container without undue effort or cutting tools. Each latch 50 includes at least one latching finger 54 that engages the container to hold latch 50 in the latched position. Latching finger 54 may be disposed through an opening 56 or may engage a ledge 56 to engage the container with a snap fit.

Figure 1:
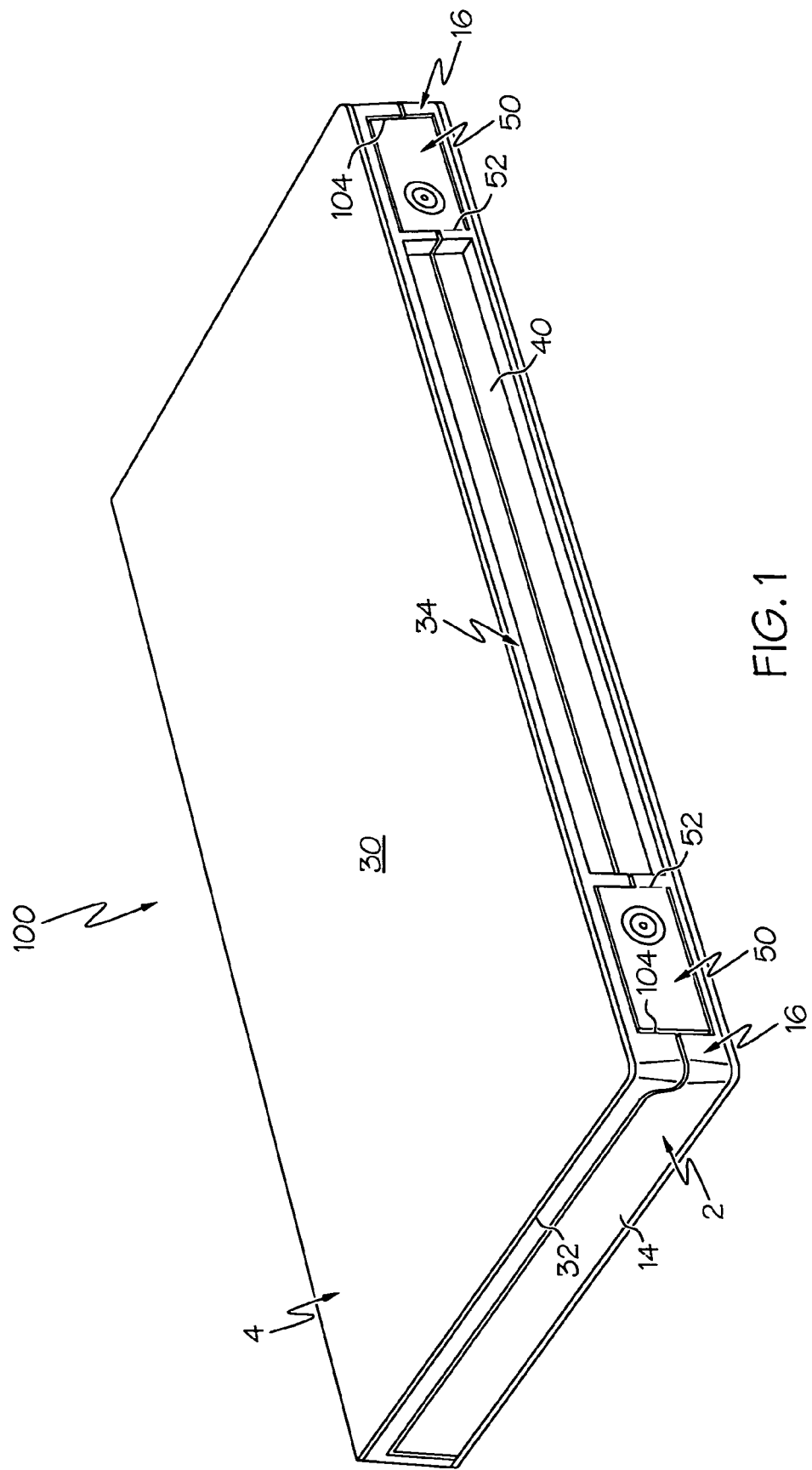
FIG. 1 is a perspective view of the front of a first configuration of a media storage container having an external latch.
Figure 2:
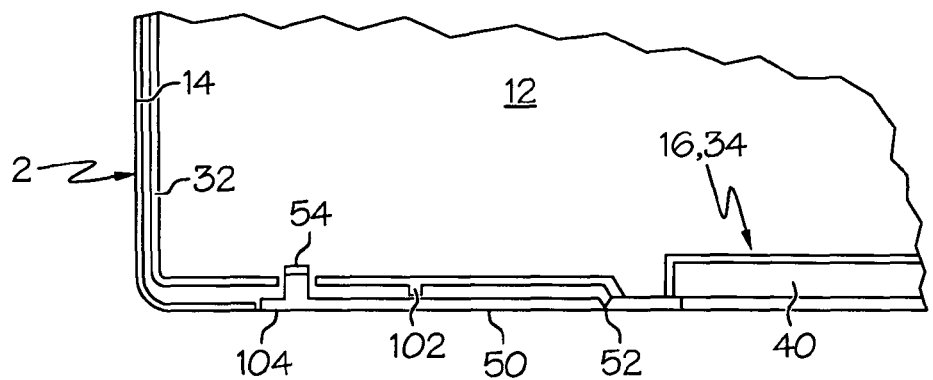
FIG. 2 is a top view of the latch of FIG. 1 with the top wall of the lid removed to show the latch.
Figure 3:
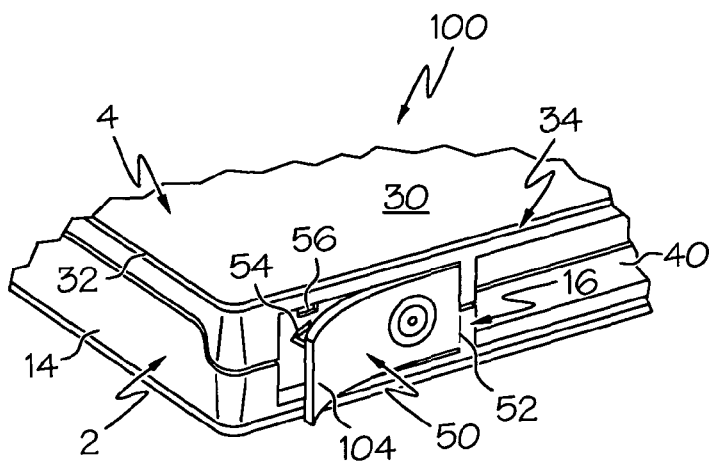
FIG. 3 is a view similar to FIG. 1 showing a force applied to the latch to move the latch to the unlatched position.
Figure 4:
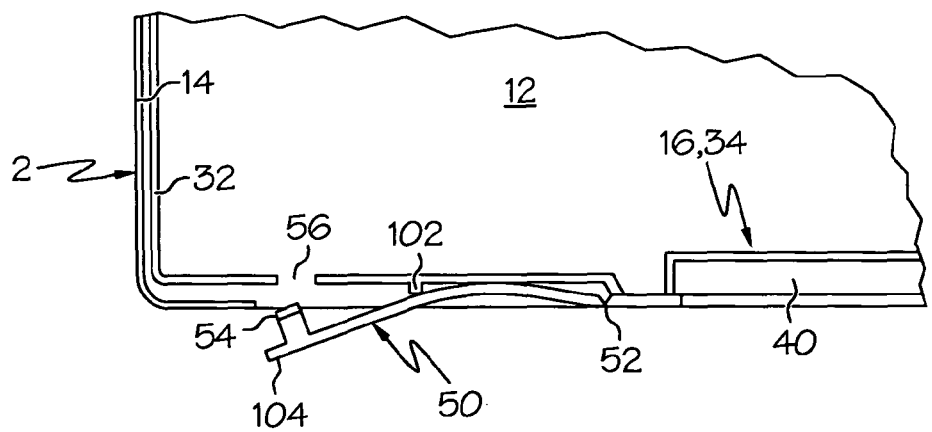
FIG. 4 is a top view of the latch of FIG. 3 with the top wall of the lid removed to show the latch.

The first configuration of the media storage container is indicated generally by the numeral 100 in FIGS. 1-4. Container 100 includes at least one latch 50 that holds lid 4 closed to base 2 when latch 50 is in the latched position shown in FIGS. 1 and 2. In container 100, latch 50 is disposed adjacent the corner of the container. Hinge 52 is disposed perpendicular to living hinges 26 and 28 and is vertical when the container is disposed flat on bottom wall 12 (disposed perpendicular to the longitudinal direction of the front wall of container 100). Latch 50 may be disposed flush with or inwardly of the outermost portions of front walls 16 and 34. In order to allow the user to grasp a portion of latch 50, a pivot bar 102 extends outwardly from one of, or both, front walls 16 and 34 to allow an outer end potion 104 of latch 50 to be pivoted outwardly when the user pushes on latch 50 between bar 102 and hinge 52 as shown in FIG. 4. This latch may be moved to a storage position inside the storage chamber of the container by opening lid 4, pivoting latch 50 inside container 100, and then closing lid 4. When a storage position for latch 50 is desired, an opening for latch 50 is provided in front wall 34 of lid 4 near hinge 52 to allow lid 4 to close over latch 50.

Figure 5:
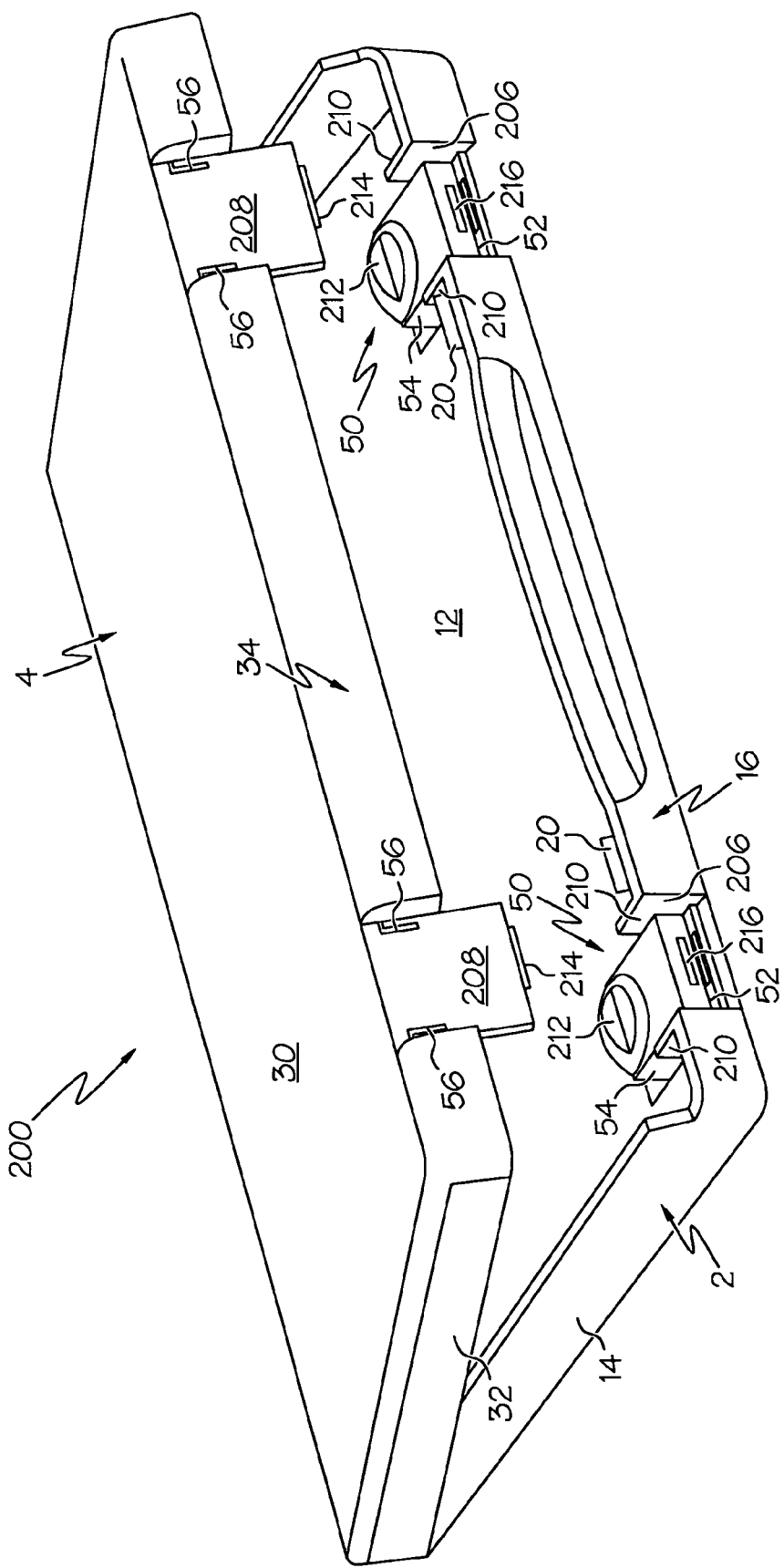
FIG. 5 is a perspective view of the front of a second configuration of a media storage container having an external latch showing the latch in an internal position.
Figure 6:
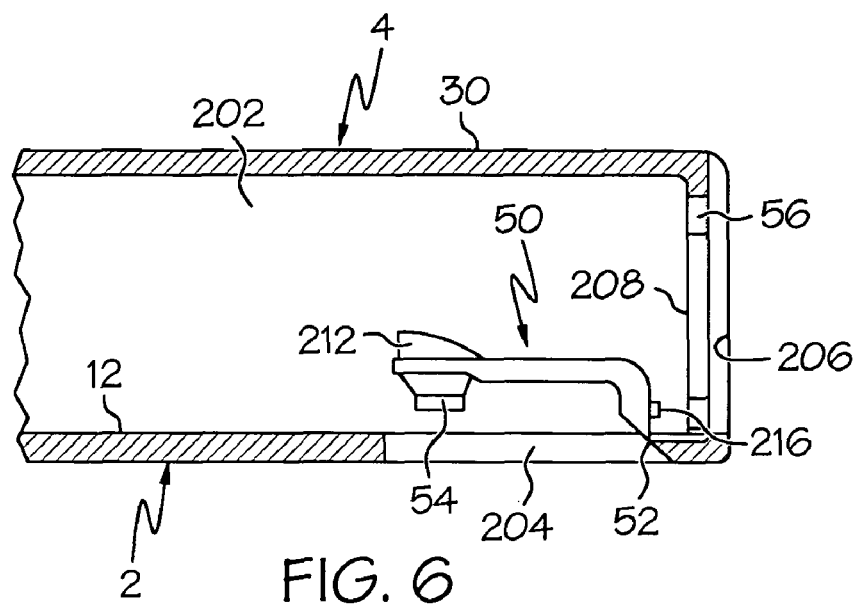
FIG. 6 is a section view showing the latch disposed internal to the container.
Figure 7:
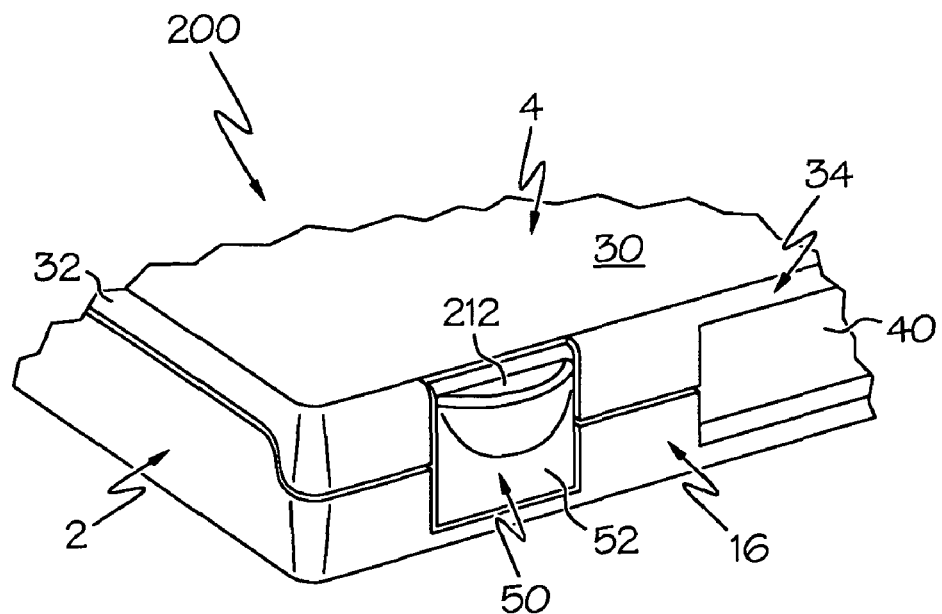
FIG. 7 is a perspective view similar to FIG. 5 showing the latch in the latched position.
Figure 8:
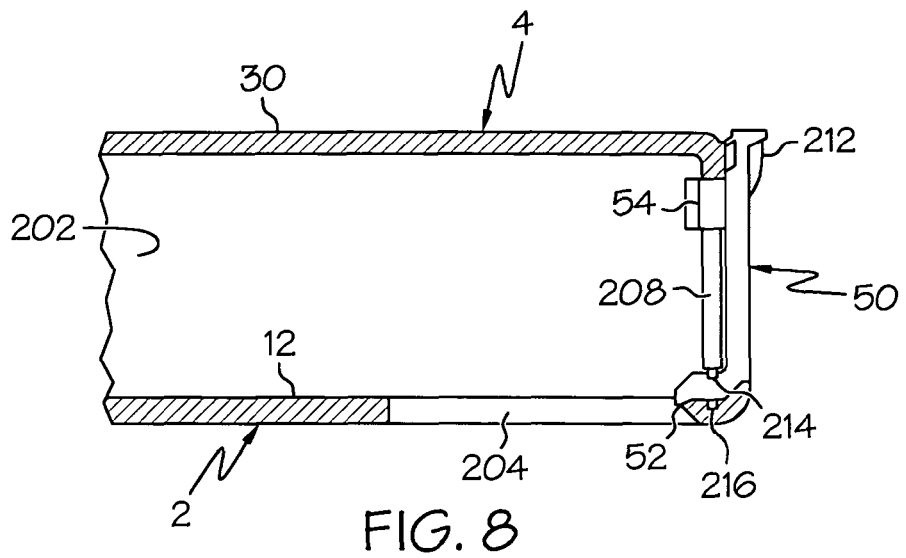
FIG. 8 is a section view of the latch of FIG. 7.
Figure 9:
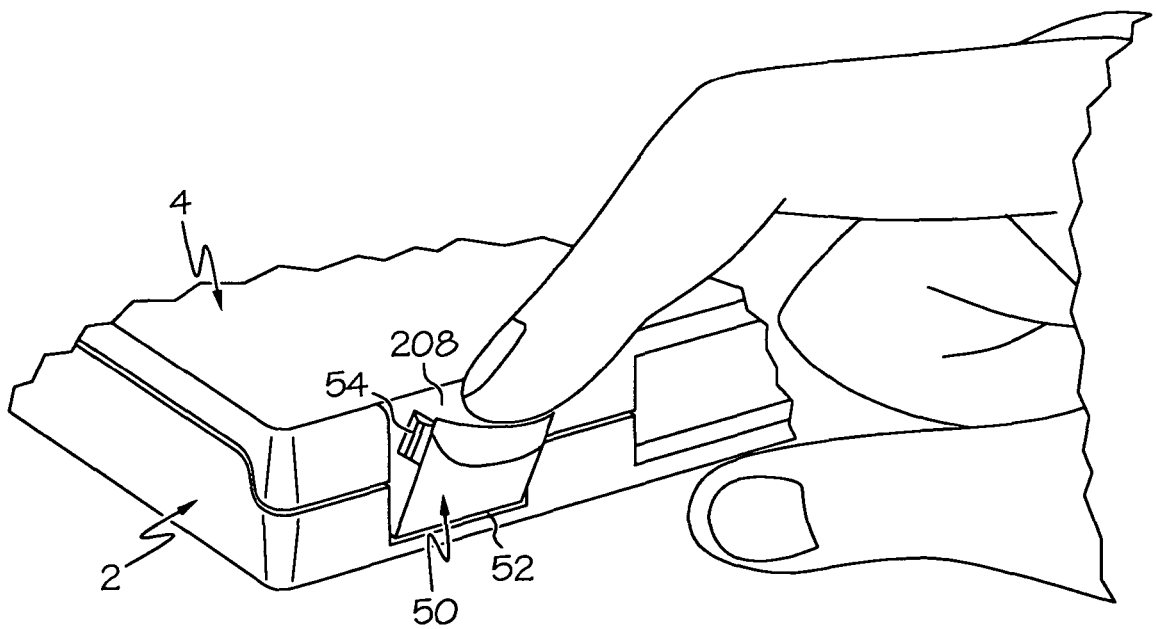
FIG. 9 is a perspective view showing a user moving the latch from the latched position to the unlatched position.

The second configuration of the media storage container is indicated generally by the numeral 200 in FIGS. 5-9. Container 200 includes at least one latch 50 that holds lid 4 closed with respect to base 2 when latch 50 is in the latched position shown in FIGS. 7 and 8. In container 200, latch 50 may be moved to a storage position where latch 50 is disposed inwardly of the outer periphery of the container as shown in FIGS. 5 and 6. The storage position of latch 50 may be completely within the storage chamber 202 of the container or may cross one of front walls 16 and 34 to be partially disposed within chamber 202.

A bottom opening 204 allows latch 50 to be molded in the storage position as shown in FIGS. 5 and 6. When latch 50 is needed, latch 50 may be pivoted out through a gap 206 defined by front wall 16 to an unlatched position. Lid 4 then may be closed causing a blocking wall 208 portion (that may define openings 56) of front wall 34 to fill a substantial portion of gap 206. In this position, wall 208 may engage latch 50. Latch 50 then may be moved to the latched position causing fingers 54 to snap into openings 56. Support walls 210 may extend inwardly on the sides of gap 206 to stiffen the container around latch 50 and to prevent latch 50 from catching on the inner surface of front wall 16 when latch 50 is pivoted from the storage position to the unlatched position. Latch 50 may define a finger detent 212 to allow the user to grasp latch 50 to pull it from the latched position to the unlatched position. A protrusion 214 may extend from blocking wall 208 to engage a recess defined by latch 50 to stiffen the container when lid 4 is closed and latch 50 is latched or unlatched. Another protrusion 216 may extend from latch 50 to engage a recess to stiffen the container when lid 4 is closed and latch 50 is latched or unlatched.

This configuration of the container allows latch 50 to be molded in the storage position if desired. Container may be closed for shipping without creating a container profile that is larger than a standard container. Retainers 18 and 20 may be used to keep lid 4 closed to base 2. The containers are shipped to a replicator where the container may be run through standard automation processes that place the item of recorded media in the container. Once the item of recorded media is loaded into container, latch 50 is moved to the unlatched position, the lid is closed, and the latch is moved to the latched position. The loaded container then may be wrapped and delivered to a retail facility. When the customer purchases the container, the customer moves latch 50 from the latched position to the unlatched position, opens lid 4, and pivots latch 50 back to its storage position. The customer then may use the container just as a typical storage container would be used. In the alternative, the customer may remove latch 50 by tearing hinge 52. Another alternative is to move latch 50 from the storage position to the unlatched position before the container is run through the automated media loading process. Lid 50 may be closed automatically and latches 50 may be latched automatically by the automated equipment.

The third configuration of the media storage container is indicated generally by the numeral 300 in FIGS. 10-11. Container 300 includes at least one outer latch 50 that holds lid 4 closed to base 2 when latch 50 is in the latched position shown in the drawings. In this configuration, a pair of latch portions 50A and 50B interact with each other in the latched position. The inner latch portion 50A of FIG. 11 is bent outwardly to engage the outer latch portion 50B. The inner latch portion 50A may be pushed inwardly to disengage from latch portion 50B to unlatch container 300.

Figure 12:
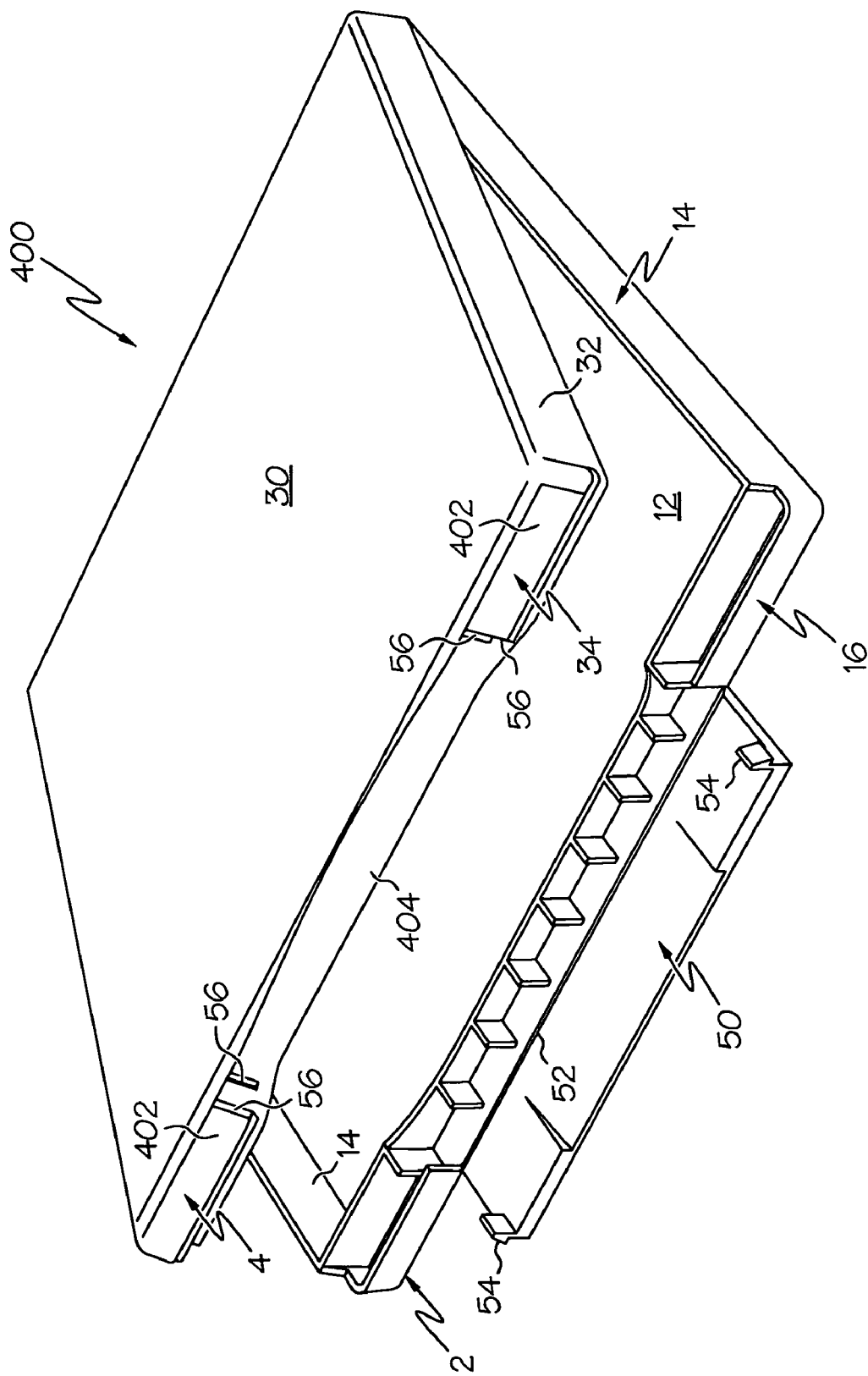
FIG. 12 is a perspective view of the front of a fourth configuration of a media storage container having an external latch showing the latch in the unlatched position.
Figure 13:
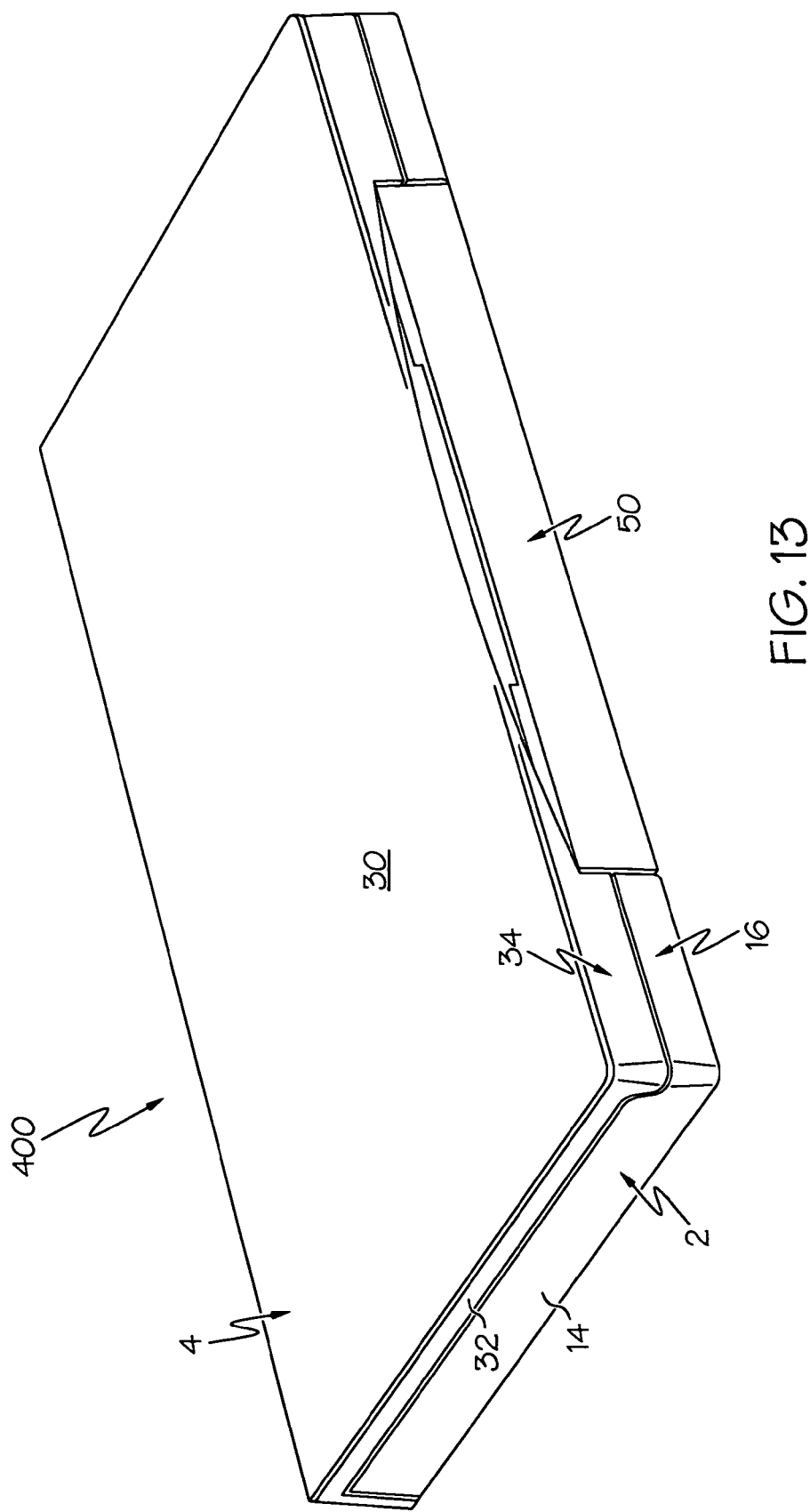
FIG. 13 is a perspective view of the front of the fourth configuration showing the latch in the latched position.

The fourth configuration of the media storage container is indicated generally by the numeral 400 in FIGS. 12-13. Container 400 includes at least one outer latch 50 that holds lid 4 closed to base 2 when latch 50 is in the latched position shown in FIG. 13. Fingers 54 are disposed at or adjacent the outer ends of latch 50. Recesses 56 may be disposed in the inner portion 402 of front wall 34. Recesses 56 also may be defined by the inner edge of the outer front wall portion 404 so that fingers 54 do not extend through inner portion 402.

Figure 14:
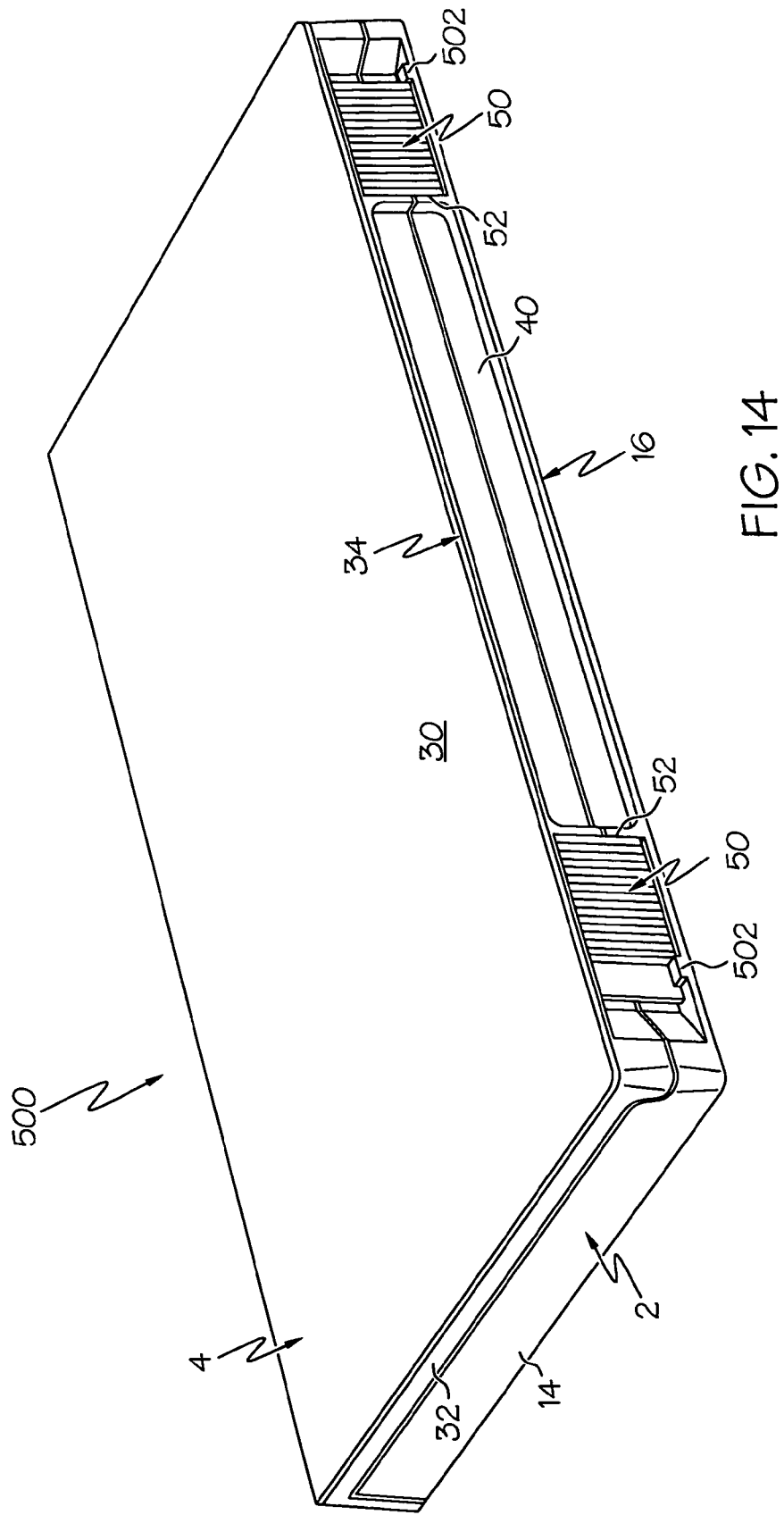
FIG. 14 is a perspective view of the front of a fifth configuration of a media storage container having an external latch showing the latch in an unlatched position.
Figure 15:
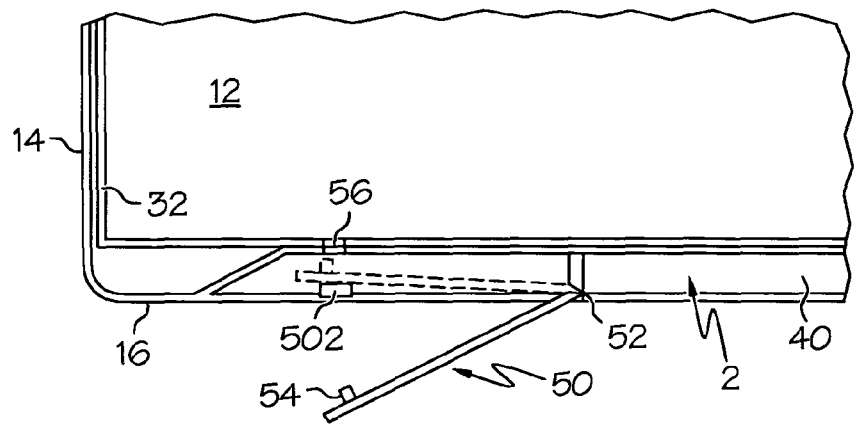
FIG. 15 is a section view of the latch of FIG. 14.
Figure 16:
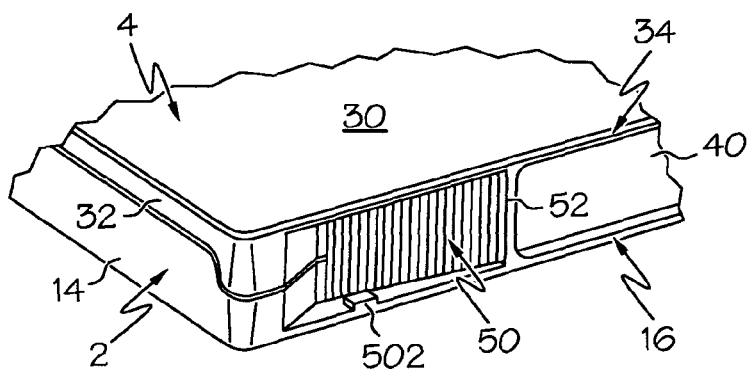
FIG. 16 is a view similar to FIG. 14 showing the latch in its latched position.
Figure 17:
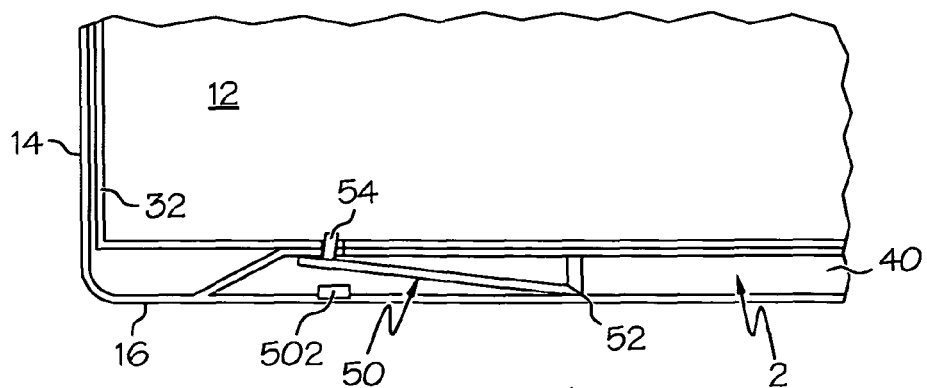
FIG. 17 is a section view of the latch of FIG. 16.
Figure 18:
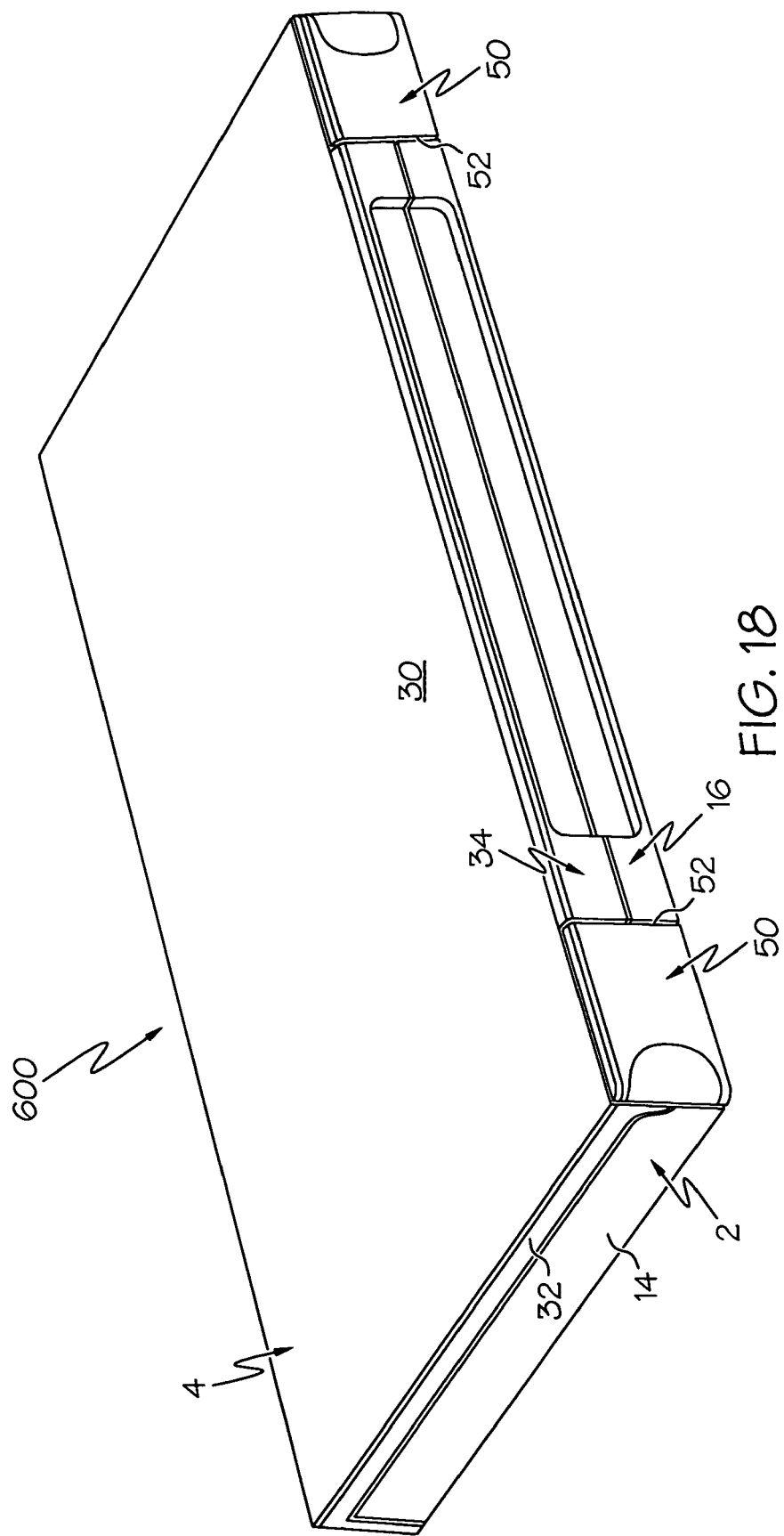
FIG. 18 is a perspective view of the front of a sixth configuration of a media storage container having an external latch showing the latch in a latched position.
Figure 19:
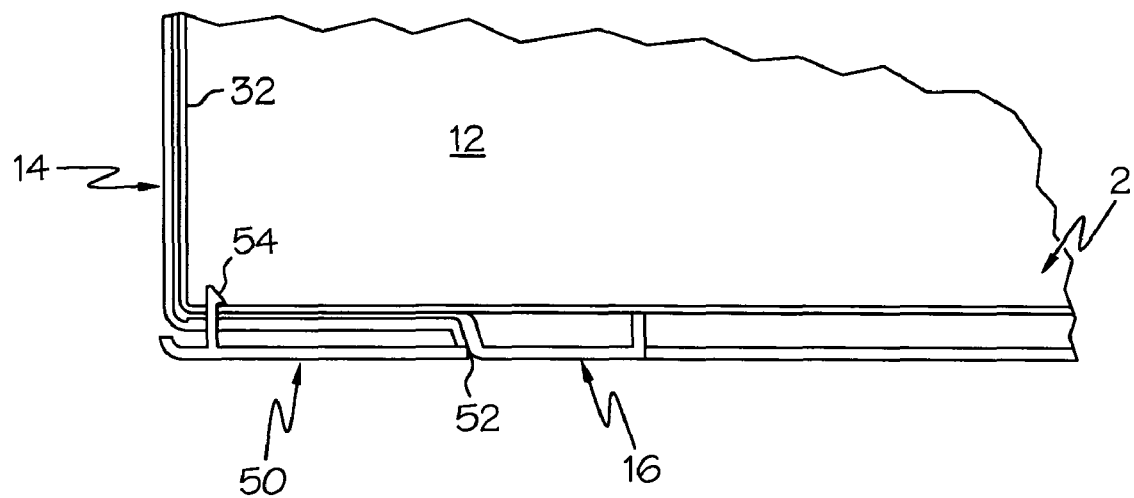
FIG. 19 is a section view of the latch of FIG. 18.
Figure 21:
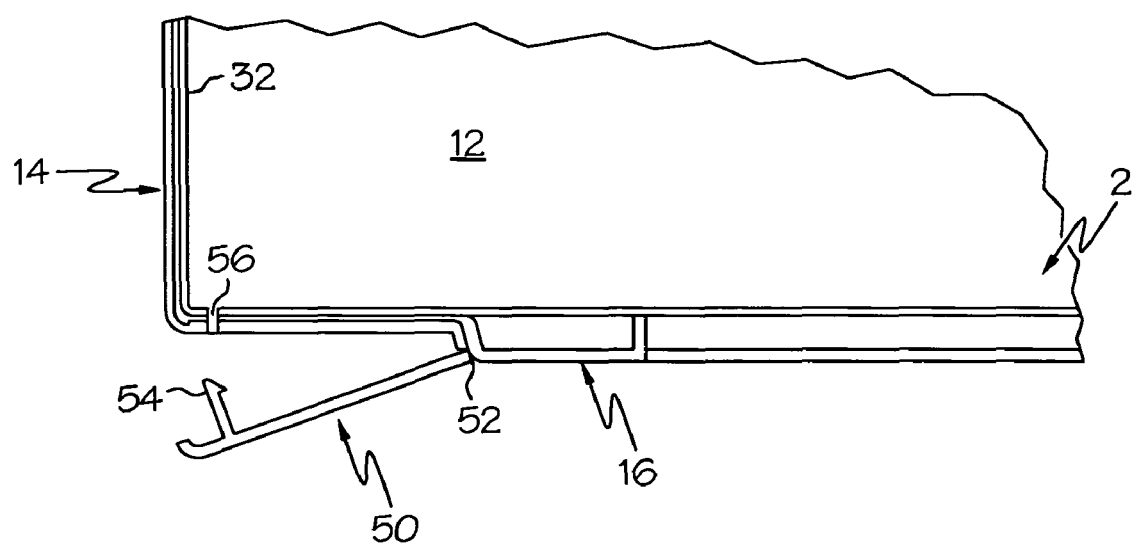
FIG. 21 is a section view of the latch of FIG. 20.

The fifth configuration of the media storage container is indicated generally by the numeral 500 in FIGS. 14-17. Container 500 includes at least one outer latch 50 that holds lid 4 closed to base 2 when latch 50 is in the latched position shown in FIGS. 16 and 17. This configuration allows latch 50 to be disposed in a storage position that is inside the outer periphery of the container but not within the storage chamber of the container because latch 50 remains disposed outwardly of front walls 16 and 34 as shown in FIGS. 14 and 15. A detent 502 holds latch 50 in the storage position.

Figure 20:
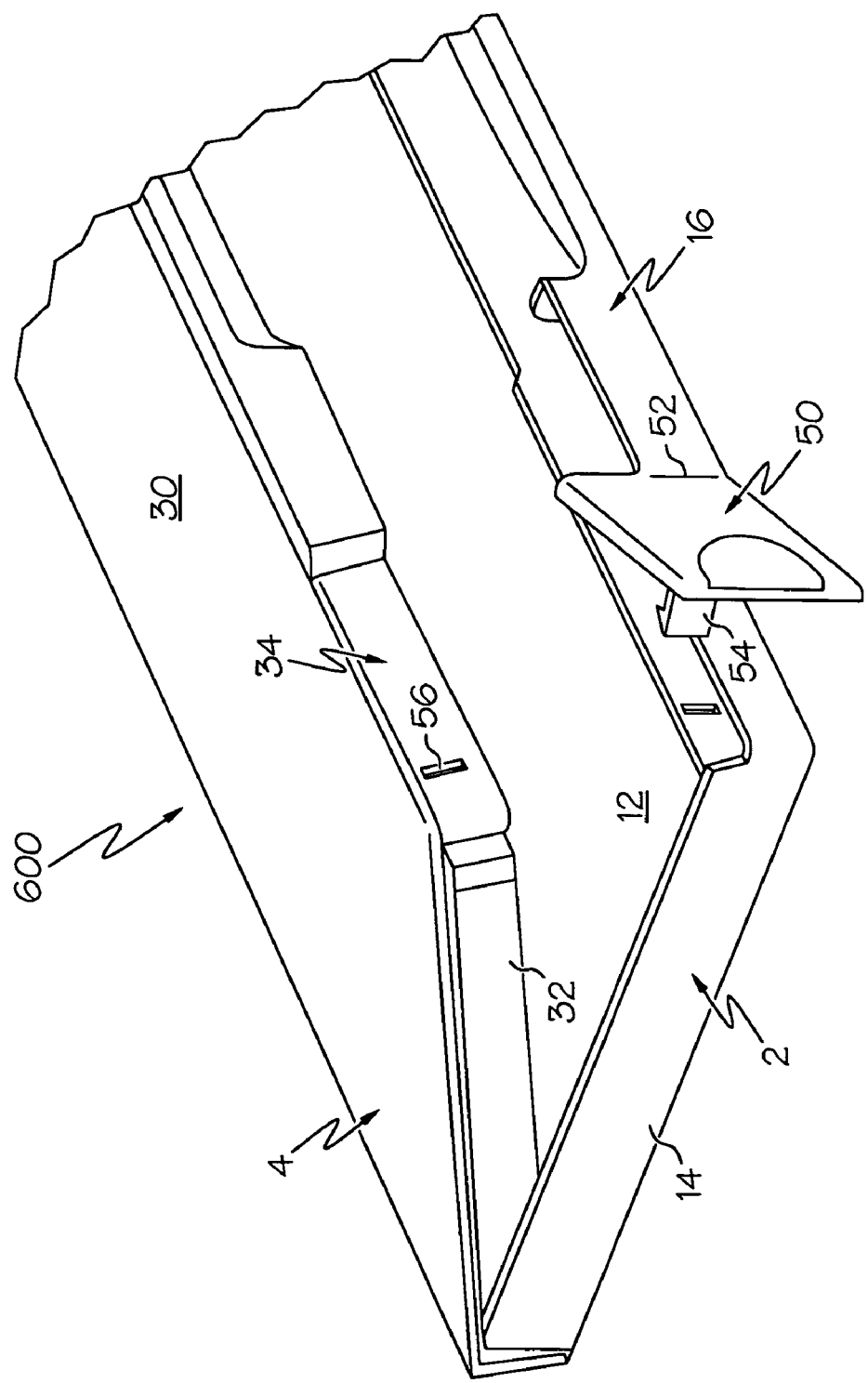
FIG. 20 is a view similar to FIG. 18 showing the latch in its unlatched position.

The sixth configuration of the media storage container is indicated generally by the numeral 600 in FIGS. 18-21. Container 600 includes at least one outer latch 50 that holds lid 4 closed to base 2 when latch 50 is in the latched position shown in FIGS. 18 and 19. Latches 50 in this configuration are disposed at the corners of the container. FIG. 20 depicts a configuration where wall 16 has an inner full-height portion having an opening that is aligned with opening 56 when lid 4 is closed.

The concepts of the different configurations may be interchanged with each other to provide further container configurations.

The invention claimed is:

1. A media storage container comprising:
   a base;
   a lid associated with the base and movable with respect to the base between open and closed positions;
   the base and lid defining an outer periphery when the lid is in the closed position;
   a storage chamber being defined between the base and lid when the lid is in the closed position; the storage chamber being adapted to receive an item of media;
   a latch connected to one of the base and lid with a hinge; the latch being movable between unlatched, latched, and storage positions;
   in the latched position, the latch engaging the other of the base and lid to prevent the lid from being moved from the closed position to the open position;
   in the unlatched position, the latch allowing the lid to be moved from the closed position to the open position; and
   in the storage position, at least a portion of the latch being disposed within the storage chamber and disposed inwardly of the outer periphery of the base and lid when the lid is closed and the latch allowing the lid to be moved from the closed position to the open position.

2. The container of claim 1, wherein the base and lid have front walls; the latch being disposed outwardly of the outer periphery of the base and lid front walls when the lid is closed and the latch is in the unlatched position.

3. The container of claim 2, wherein the latch pivots between the latched, unlatched, and storage positions.

4. The container of claim 1, wherein the base includes a hinge wall and a bottom wall; the hinge wall being connected to the bottom wall with a first living hinge and the hinge wall is connected to the lid with a second living hinge; and the first and second living hinges being parallel and spaced apart.

5. The container of claim 1, wherein the other of the base and lid has a front wall that defines a latch opening; the latch including a finger disposed in the latch opening when the lid is closed and the latch is in the latched position.

6. The container of claim 1, wherein the one of the base and lid to which the latch is connected has a front wall; the front wall defining a gap that allows the latch to pivot through the gap from the unlatched position to the storage position.

7. The container of claim 1, wherein the latch may be removed from the container by tearing the latch from the container.

8. A media storage container comprising:
   a base;
   a lid associated with the base and movable with respect to the base between open and closed positions;
   the base and lid defining an outer periphery when the lid is in the closed position;
   a latch connected to one of the base and lid with a hinge; the latch being movable between unlatched, latched, and storage positions;
   in the latched position, the latch engaging the other of the base and lid to prevent the lid from being moved from the closed position to the open position;
   in the unlatched position, the latch allowing the lid to be moved from the closed position to the open position;
   in the storage position, the latch being disposed inwardly of the outer periphery of the base and lid when the lid is closed and the latch allowing the lid to be moved from the closed position to the open position; and
   a retainer that holds the latch in the storage position.

9. A media storage container comprising:
   a base having a bottom wall, a front wall, and a hinge wall;
   a media retainer associated with the bottom wall of the base; the media retainer adapted to retain a disc-shaped item of recorded media to the base;
   the hinge wall being connected to the bottom wall with a first living hinge;
   a lid associated with the base and movable with respect to the base between open and closed positions;
   the lid having a top wall and a front wall;
   the front walls of the base and lid cooperating to define a front wall of the container when the lid is in the closed position;
   an inner retainer releasably holding the lid in the closed configuration;
   the hinge wall being connected to the top wall of the lid with a second living hinge;
   the first and second living hinges being parallel and spaced apart;
   a latch pivotably connected to the base; the latch being pivotably movable between unlatched, latched, and storage positions;
   the front wall of the base defining a gap that allows the latch to pivot through the gap when moved from the unlatched position to the storage position;
   in the latched position, the latch engaging the lid to prevent the lid from being moved from the closed position to the open position;
   in the unlatched position, the latch allowing the lid to be moved from the closed position to the open position;
   in the storage position, a portion of the latch being disposed inwardly of the front wall of the base and the latch allowing the lid to be moved from the closed position to the open position; and
   in the storage position, a portion of the latch being disposed between the front wall of the container and the media retainer.

10. The container of claim 9, wherein the inner retainer is disposed inwardly of the front walls of the base and lid when the lid is in the closed position.

11. A media storage container comprising:
    a container having an open configuration and a closed configuration; the container defining a storage compartment adapted to receive an item of recorded media;
    the container including a media retainer projecting into the storage chamber;
    the container including a latch that is pivotably movable between latched, unlatched, and storage positions;
    in the latched position, the latch maintaining the container in the closed configuration;
    in the unlatched position, the container being reconfigurable from the closed configuration to the open configuration; and
    in the storage position, at least a portion of the latch being disposed within the storage chamber and disposed inwardly of an outer periphery of the container without interfering with the opening and closing of the container.

12. The container of claim 11, further comprising an inner retainer that releasably holds the container in the closed configuration.

13. A media storage container comprising:
    a base having a front wall; the front wall defining a gap;

a lid associated with the base and movable with respect to the base between open and closed positions;

a storage chamber being defined between the base and lid when the lid is in the closed position; the storage chamber being adapted to receive an item of media;

a latch connected to the base; the latch being aligned with the gap defined by the front wall;

the latch being pivotably movable between unlatched, latched, and storage positions;

in the latched position, the latch engaging the lid to prevent the lid from being moved from the closed position to the open position;

in the unlatched position, the latch allowing the lid to be moved from the closed position to the open position; and in the storage position, a portion of the latch being disposed within the storage chamber and disposed inwardly of the gap defined by the front wall of the base and the lid being movable between the open and closed positions.

14. The container of claim 13, wherein the lid includes a blocking wall that is aligned with that gap defined by the front wall of the base when the lid is in the closed position.

15. The container of claim 14, wherein the blocking wall fills a substantial portion of the gap defined by the front wall of the base when the lid is in the closed position.

16. A merchandise storage container comprising:

a base;

a lid associated with the base and movable with respect to the base between open and closed positions;

a latch connected to one of the base and lid with a hinge; the latch being repeatedly movable between unlatched, latched, and storage positions;

in the latched position, the latch releasably engaging the other of the base and lid to prevent the lid from being moved from the closed position to the open position;

in the unlatched position, the latch allowing the lid to be moved from the closed position to the open position; and in the storage position, the latch being disposed inwardly of an outer periphery of the base and lid when the lid is closed and the latch allowing the lid to be moved from the closed position to the open position.

17. The container of claim 16, wherein the entire latch may be removed from the container by tearing the latch from the container.

18. The container of claim 16, wherein the base and lid cooperate to define a storage chamber when the lid is in the closed position; at least a portion of the latch being disposed in the storage chamber when the latch is in the storage position.

19. The container of claim 18, wherein the entire latch is disposed in the storage chamber when the latch is in the storage position.

* * * * *